(12) United States Patent
Rehfus et al.

(10) Patent No.: US 9,273,738 B2
(45) Date of Patent: Mar. 1, 2016

(54) BELT PARK BRAKE AND METHODS

(71) Applicant: Goodrich Corporation, Charlotte, NC (US)

(72) Inventors: Kevin Rehfus, Troy, OH (US); David B. Drennen, Bellbrook, OH (US); Robert French, Beavercreek, OH (US); Harald Klode, Centerville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/292,097

(22) Filed: May 30, 2014

(65) Prior Publication Data
US 2015/0345576 A1    Dec. 3, 2015

(51) Int. Cl.
| | | |
|---|---|---|
| *F16H 7/08* | (2006.01) | |
| *F16D 49/10* | (2006.01) | |
| *F16D 65/16* | (2006.01) | |
| *F16D 121/24* | (2012.01) | |
| *F16D 125/40* | (2012.01) | |

(52) U.S. Cl.
CPC ............... *F16D 49/10* (2013.01); *F16D 65/16* (2013.01); *F16D 2121/24* (2013.01); *F16D 2125/40* (2013.01)

(58) Field of Classification Search
CPC ............... F16H 2007/0874; F16H 2007/0823; F16H 7/02; F16D 67/02; A63B 22/0015; A63B 2022/0017; B60T 8/1703; F16D 49/08; F16D 49/10; F16D 4965/065
USPC .......... 482/52; 474/88, 134; 188/77 R, 77 W; 310/77, 93, 96, 97
See application file for complete search history.

(56) References Cited

U.S. PATENT DOCUMENTS

| | | | | |
|---|---|---|---|---|
| 1,604,570 | A | * 10/1926 | Hardin | F16D 49/10 188/77 R |
| 2,791,910 | A | * 5/1957 | Eckley | 474/134 |
| 3,313,379 | A | * 4/1967 | Dence | B60T 1/06 188/250 B |
| 4,197,927 | A | 4/1980 | Holcomb, Jr. et al. | |
| 5,133,513 | A | * 7/1992 | Cassidy | B65H 59/04 188/251 A |
| 5,185,542 | A | 2/1993 | Lazorchak | |

(Continued)

FOREIGN PATENT DOCUMENTS

| | | |
|---|---|---|
| DE | 3012611 | 10/1980 |
| DE | 20102748 U1 * | 12/2001 |

(Continued)

OTHER PUBLICATIONS

EPO; Search Report published on Dec. 11, 2015 in EP Application No. 15168951.0.

*Primary Examiner* — Bradley King
*Assistant Examiner* — Stephen Bowes
(74) *Attorney, Agent, or Firm* — Snell & Wilmer L.L.P.

(57) ABSTRACT

Park brake systems comprising a motor shaft coupled to a brake drum, wherein the brake drum comprises a first groove and a second groove, wherein the brake drum is mounted to the motor shaft so as to rotate with the motor shaft, a first belt at least partially disposed in the first groove and about a first pivot linkage, a second belt at least partially disposed in the second groove and about a second pivot linkage, a first actuator piston coupled to an actuator and the first pivot linkage, a second actuator piston coupled to the actuator and the second pivot linkage, and a pivot base coupled to the first pivot linkage and the second pivot linkage are disclosed. Methods are also disclosed.

15 Claims, 6 Drawing Sheets

(56) References Cited

U.S. PATENT DOCUMENTS

2005/0098396 A1* 5/2005 Baumann .............. F16D 49/08 188/77 W
2007/0125331 A1* 6/2007 Finis et al. ............. 123/90.17

FOREIGN PATENT DOCUMENTS

| EP | 0059672 | | 9/1982 |
| JP | 52066157 | A * | 6/1977 |

* cited by examiner

US 9,273,738 B2

BELT PARK BRAKE AND METHODS

FIELD

The present disclosure relates to methods and systems for belt park brakes.

BACKGROUND

Typical aircraft brakes comprise one or more rotors and stator that, when compressed axially, cause an aircraft wheel to resist rotation. While parked, it may be desirable to maintain brake compression to resist unwanted movement of the aircraft.

SUMMARY

Park brake systems comprising a motor shaft coupled to a brake drum, wherein the brake drum comprises a first groove and a second groove, wherein the brake drum is mounted to the motor shaft so as to rotate with the motor shaft, a first belt at least partially disposed in the first groove and about a first pivot linkage, a second belt at least partially disposed in the second groove and about a second pivot linkage, a first actuator piston coupled to an actuator and the first pivot linkage, a second actuator piston coupled to the actuator and the second pivot linkage, and a pivot base coupled to the first pivot linkage and the second pivot linkage are disclosed.

Methods for comprising activating a first actuator piston coupled to an actuator and a first pivot linkage, activating a second actuator piston coupled to the actuator and a second pivot linkage, wherein the first pivot linkage and the second pivot linkage are coupled to a pivot base, tensioning a first belt at least partially disposed in a first groove of a brake drum and about the first pivot linkage, tensioning a second belt at least partially disposed in a second groove of the brake drum and about the second pivot linkage, wherein a motor shaft is coupled to the brake drum, and constraining rotation of the motor shaft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

An aircraft brake system may comprise an end plate distal from a plurality of interleaved rotor disks and stator disks which together form a brake heat sink. Each rotor disk may be coupled to the wheel for rotation therewith and each stator disk may be coupled to the wheel support against rotation. The brake mechanism also generally includes a torque tube and a back leg on which a pressure plate, end plate and stator disks are slidably mounted against rotation relative to the wheel and rotor disks. The stator disks may comprise two wear faces and the pressure plate may comprise a single wear face. The rotors disks and stator disks may be formed of a friction material, such a carbon/carbon or a carbon metallic matrix material. A brake head may house the piston motor or one or more rams that extend to move the pressure plate and axially compress the brake stack against the end plate.

In various embodiments, a brake system may comprise a brake system controller ("BSC") coupled to one or more electromechanical actuator controller ("EMACs"), which may drive an electromechanical actuator ("EMA"). The BSC may be in communication with a brake pedal, and thus may control the EMACs in accordance with pilot/copilot braking commands. The EMA may be coupled to or otherwise operate a pressure generating device, such as, for example, a ball screw, a ram, and/or the like. In operation, the EMA may cause the pressure generating device to move and/or exert a force on other brake system structures, such as a brake disk or pad to exert a stopping force on a wheel or other suitable moving structure. This stopping force may load and/or exert a corresponding force on the EMA structures such as, for example, an EMA housing.

Figure 1:
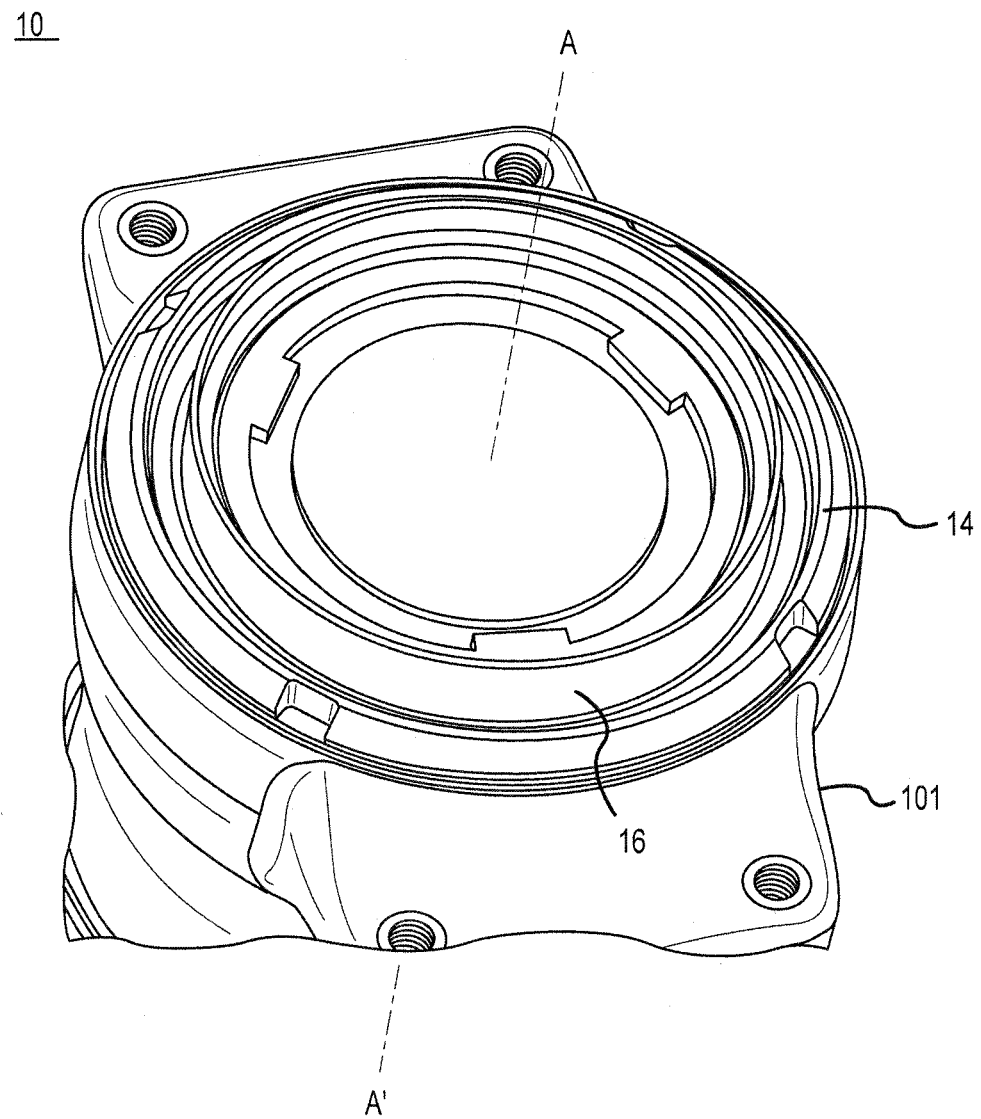
FIG. 1 illustrates an electromechanical actuator, in accordance with various embodiments.

For example, with reference to FIG. 1, a perspective view of an EMA 10 is shown. The EMA may extend along the axis marked A-A', with A being located near a distal portion of EMA 10 and A' being near a proximal portion of EMA 10. The EMA 10 may, as described above, be involved in the application of a braking force to an aircraft wheel. The EMA 10 assembly may comprise an EMA, housing 101, which may extend along the axis A-A'. The EMA housing 101 may house a variety of components, including, for example, a ball nut 14, a ball screw 16, and a motor drive unit. Generally, the motor drive unit may drive the ball screw 16 through a plurality of rotations. As the ball screw 16 rotates, the ball, nut 14 may translate distally and/or proximally along the axis A-A' (depending upon the direction of rotation of the ball screw 16). The ball nut 14 may be coupled to a disc or "puck" at a distal end thereof. The puck may exert a pressure against a brake stack coupled to an aircraft wheel to impede or halt a rolling motion of the wheel. The EMA may include a bi-stable park brake. For example, the EMA may comprise a park brake system (as described below with reference to FIG. 3).

A brake may be used to prevent an EMA from rotating the ball screw in one state, while permitting rotation of the ball screw in a second state. For example, in a bi-stable brake, prevention of ball screw rotation may be advantageous in a parking brake mode. A bi-stable brake may be switched from one state to another vis-à-vis a brake stack. The brake stack may take a first state that prevents ball screw rotation (i.e., a "locked state") and a second state that allows ball screw rotation (i.e., an "unlocked state").

Figure 2:
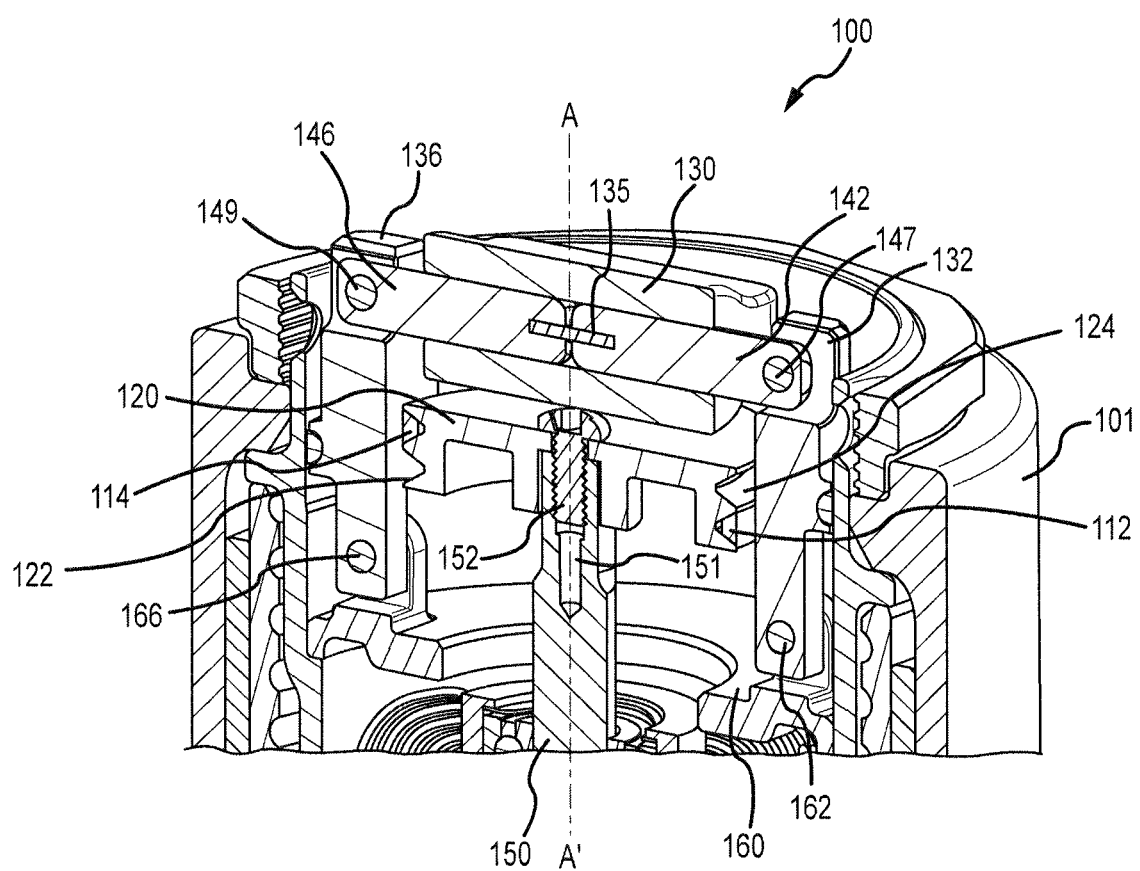
FIG. 2 illustrates a cross-sectional view of a park brake system, in accordance with various embodiments.

With reference to FIG. 2, a belt park brake system 100, in accordance with various embodiments, is illustrated. In various embodiments, the belt park brake system 100 may comprise a motor shaft 150 coupled to a brake drum 120. According to various embodiments, brake drum 120 may be coupled to motor shaft 150 by any known or hereinafter developed method of coupling. Various methods of coupling include the use of splines, mating shapes between motor shaft 150 and brake drum 120 (e.g., a D-shape), fasteners, etc. For example, in various embodiments, brake drum 120 may be fastened to motor shaft 150 with bolt 152, which may be mated with the orifice 151 of motor shaft 150. Thus, in accordance with various embodiments, the brake drum 120 may be mounted to the motor shaft 150 so as to rotate with the motor shaft 150.

According to various embodiments, the brake drum 120 may comprise a first groove 124 and a second groove 122. In various embodiments, a first belt 114 may be at least partially disposed in the first groove 124 and about a first pivot linkage 132. Belt park brake system 100 may comprise a second belt 112 at least partially disposed in the second groove 122 of the brake drum 120 and about a second pivot linkage 136, in accordance with various embodiments. As used herein, the term "about" when used in reference to the disposition of a belt in relation to a pivot linkage, may include in contact with and/or disposed radially outward around. For example, in various embodiments, the second belt 112 may be at least partially disposed in the second groove 122 of the brake drum 120 and radially outward of the second pivot linkage 136.

In various embodiments, a first actuator piston 142 may be coupled to an actuator 130 and the first pivot linkage 132. For example, in various embodiments, first actuator piston 142 may be coupled to the first pivot linkage 132 via first actuator pivot joint 147. Furthermore, in various embodiments, belt park brake system 100 may comprise a second actuator piston 146 coupled to the actuator 130 and the second pivot linkage 136. For example, in various embodiments, second actuator piston 146 may be coupled to the second pivot linkage 136 via second actuator pivot joint 149. In various embodiments, and as exemplified in FIG. 2, the first actuator piston 142 and the second actuator piston 146 may be separated by 180 degrees about brake drum 120.

Actuator 130 is not particularly limited and, thus, may be any now known or hereinafter developed actuator suitable for moving the first actuator piston 142 and the second actuator piston 146. Therefore according to various embodiments, the actuator 130 may be configured to drive the first actuator piston 142 and the second actuator piston 146 in a radially outward direction relative to an axis of the motor shaft 150 (e.g., radially outward from axis A-A'). In various embodiments, actuator 130 may utilize various methods of actuation (e.g., linear actuation and/or rotary actuation) and, thus, is not particularly limited. For example, actuator 130 may comprise any device that is capable of urging a member in a radially outward direction. Thus, in various embodiments, actuator 130 may be a linear actuator. In various embodiments, actuator 130 may comprise an acme screw 135. According to various embodiments, the actuator 130 may have a gear ratio between about 50:1 and about 250:1, between about 50:1 and about 225:1, between about 100:1 and about 225:1, or between about 125:1 and about 205:1, where the term about in this context only may include a value within ±2%.

In various embodiments, belt park brake system 100 may comprise a pivot base 160 coupled to the first pivot linkage 132 and the second pivot linkage 136. In various embodiments, the first pivot linkage 132 may pivot at a joint 162 with respect to the pivot base 160. Similarly, in various embodiments, the second pivot linkage 136 may pivot at a joint 166 with respect to the pivot base 160.

In accordance with various embodiments, the first belt 114 and the second belt 112 are not particularly limited and may comprise any known or hereinafter developed shape or material suitable for park brake belts. For example, in various embodiments, at least one of the first belt 114 or the second belt 112 may be a v-belt (as illustrated in FIG. 2). In various embodiments, at least one of the first belt 114 or the second belt 112 may have a D-shaped cross sectional profile. In various embodiments, at least one of the first belt 114 or the second belt 112 may comprise multiple verse single belts. Moreover, first groove 124 and second groove 122 are not particularly limited and may include any shape configured to receive corresponding first belt 114 and second belt 112.

Additionally, in various embodiments, belt park brake system 100 may comprise any plurality of belts. For example, belt park brake system 100 may comprise two belts (e.g., a first belt 114 and a second belt 112), three belts (a first belt, a second belt, and a third belt), four belts (a first belt, a second belt, and a third belt), etc. Moreover, in various embodiments, belt park brake system 100 may comprise a plurality of pivot linkages, which may correspond to the number of belts. For example, in various embodiments, belt park brake system 100 may comprise two pivot linkages (first pivot linkage 132 and second pivot linkage 136), three pivot linkages (e.g., a first pivot linkage, a second pivot linkage, and a third pivot linkage), four pivot linkages (e.g., a first pivot linkage, a second, pivot linkage, a third pivot linkage, and a fourth pivot linkage), etc. In various embodiments, the pivot linkages may be equally disposed around an axis of the motor shaft 150 (e.g., axis A-A') and, thus, may have about an equal angular separation. For example, according to various embodiments, two pivot linkages may be separated by about 180 degrees about the brake drum 120, three pivot linkages may be separated by about 120 degrees about the brake drum 120, and four pivot linkages may be separated by about 90 degrees about the brake drum 120, where the term "about" in this context only may include a value within ±2%.

In various embodiments, at least one of the first belt 114 or the second belt 112 may comprise at least one of an aramid fiber or a para-aramid fiber, such as Kevlar®, a registered mark of the E. I. Du Pont de Nemours and Company, Nomex®, also a registered mark of the E. I. Du Pont de Nemours and Company, and Technora®, a registered mark of the Teijin Corporation.

In various embodiments, belt brake system may be housed in an electromechanical actuator ("EMA") 10. For example, with continued reference to FIG. 2, FIG. 2 illustrates a belt brake system housed in EMA housing 101. Accordingly, various EMAs are disclosed, wherein the EMAs comprise various park brake systems, according to the various embodiments disclosed herein.

Figure 3:
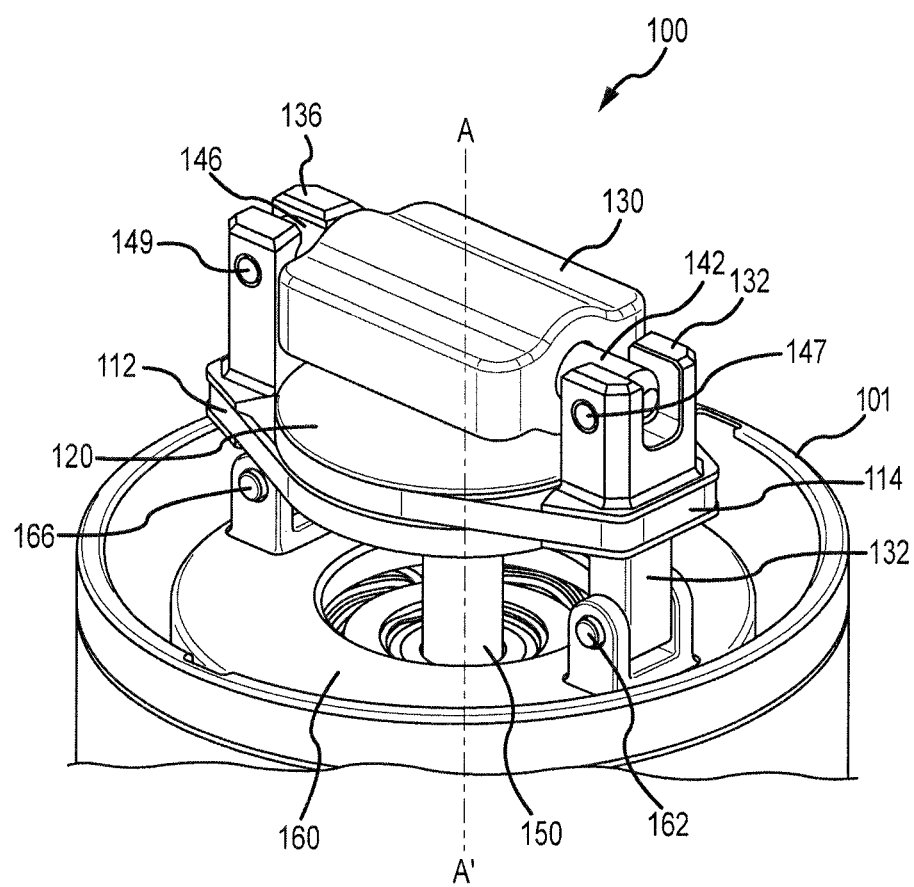
FIG. 3 illustrates a park brake system, in accordance with various embodiments.

With reference to FIG. 3, belt park brake system 100 is illustrated with a portion of EMA housing 101 removed for improved clarity, according to various embodiments. In various embodiments and as can be seen in FIG. 3, FIG. 3 illustrates belt park brake system 100 with motor shaft 150, which may be parallel to and rotate about axis A-A'. In various embodiments, motor shaft 150 may be coupled to brake drum 120. Thus, in accordance with various embodiments, the brake drum 120 may be mounted to the motor shaft 150 so as to rotate with the motor shaft 150.

According to various embodiments, a first belt 114 may be at least partially disposed in the first groove 124 (shown in FIG. 2) and about a first pivot linkage 132. Belt park brake system 100 may comprise a second belt 112 at least partially disposed in the second groove 122 (shown in FIG. 2) of the brake drum 120 and about a second pivot linkage 136, in accordance with various embodiments. For example, in various embodiments, the second belt 112 may at least partially disposed in the second groove 122 (shown in FIG. 2) of the brake drum 120 and radially outward of the second pivot linkage 136.

In various embodiments, a first actuator piston 142 may be coupled to an actuator 130 and the first pivot linkage 132. For example, in various embodiments, the first actuator piston 142 may be coupled to the first pivot linkage 132 via first actuator pivot joint 147. Furthermore, in various embodiments, belt park brake system 100 may comprise a second actuator piston 146 coupled to the actuator 130 and the second pivot linkage 136. For example, in various embodiments, second actuator piston 146 may be coupled to the second pivot linkage 136 via second actuator pivot joint 149.

In various embodiments, belt park brake system 100 may comprise a pivot base 160 coupled to the first pivot linkage 132 and the second pivot linkage 136. In various embodiments, the first pivot linkage 132 may pivot at a joint 162 with respect to the pivot base 160. Similarly, in various embodiments, the second pivot linkage 136 may pivot at a joint 166 with respect to the pivot base 160.

Figure 4:
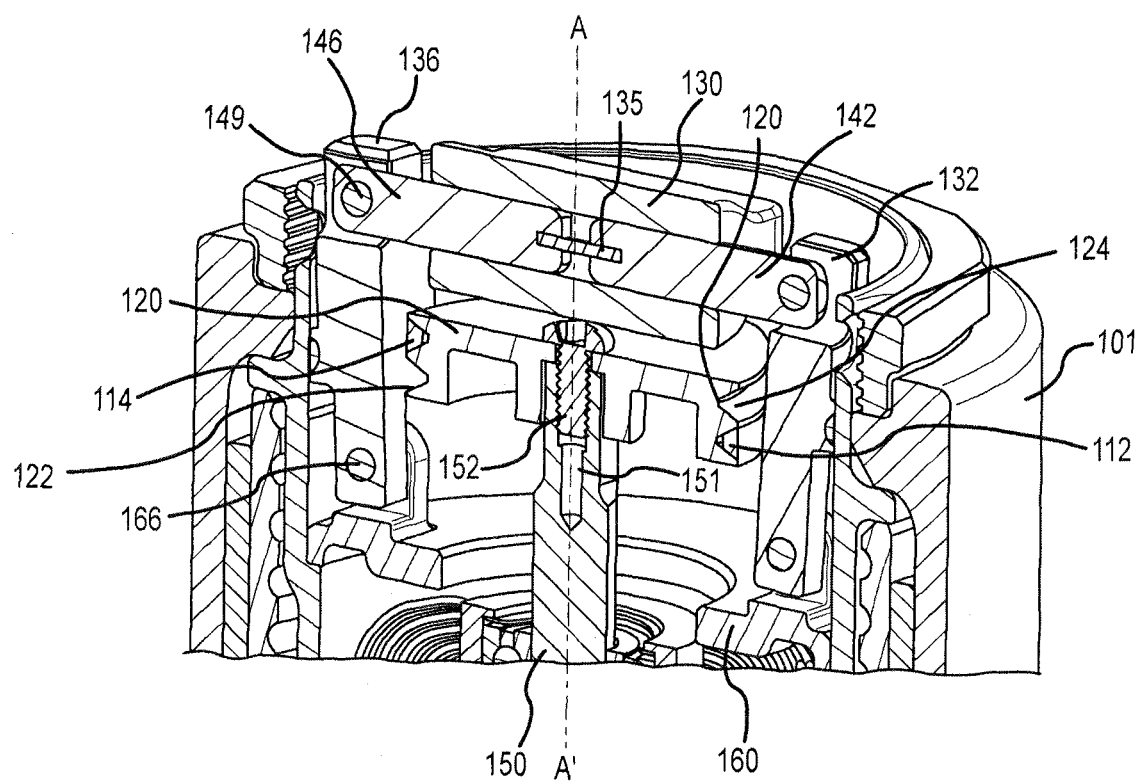
FIG. 4 illustrates a cross-sectional view of a park brake system in an engaged state, in accordance with various embodiments.

With reference to FIG. 4, belt park brake in the deployed or engaged position is illustrated. As illustrated in FIG. 4, belt park brake system 100 may comprise actuator 130, which may comprise an acme screw 135 coupled to a first actuator piston 142 and a second actuator piston 146. In various embodiments, when actuator 130 is activated, acme screw 135 may be configured to cause the first actuator piston 142 and the second actuator piston 146 to move radially outward from the motor shaft 150 (e.g., radially outward of axis A-A').

In various embodiments, the radially outward movement of the first actuator piston 142 may cause the first pivot linkage 132 coupled to the first actuator piston 142 by first actuator pivot joint 147 to extend radially outward. In various embodiments, the radial extension of first pivot linkage 132 may cause the first belt 114 to become tensioned due to the first belt 114 being disposed about (e.g., radially outward of) the brake drum 120 and the first pivot linkage 132.

Similarly, in various embodiments the radially outward movement of the second actuator piston 146 may cause the second pivot linkage 136 (coupled to second actuator piston 146 by second actuator pivot joint 149) to extend radially outward. In various embodiments, the radial extension of second pivot linkage 136 may cause a second belt 112 to become tensioned due to the second belt 112 being disposed about (e.g., radially outward of) the brake drum 120 and the second pivot linkage 136.

In various embodiments, the first pivot linkage 132 and the second pivot linkage 136 may pivot respectively at the joint 162 and the joint 166, with respect to the pivot base 160.

Figure 5:
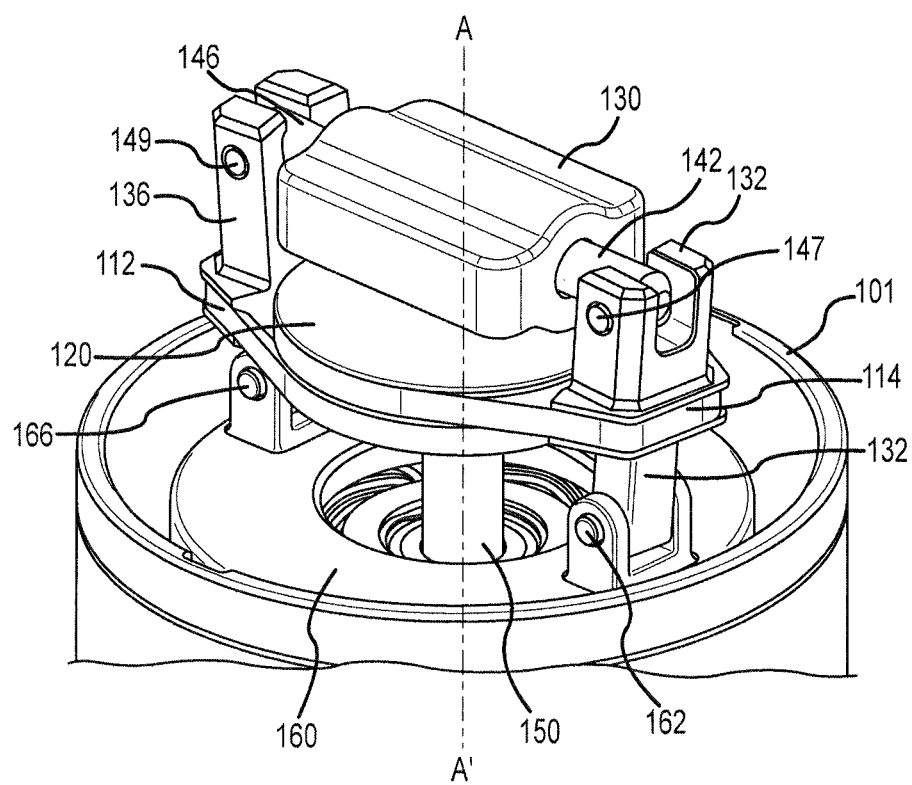
FIG. 5 illustrates a view of a park brake system in an engaged state, in accordance with various embodiments.

As can be seen in FIG. 5, belt park brake system 100 with a portion of EMA housing 101 removed for improved clarity, according to various embodiments, is illustrated in a deployed position. As can be seen in FIG. 5, in various embodiments, actuator 130 may be activated to radially extend the first actuator piston 142 and the second actuator piston 146, which may respectively extend the first pivot linkage 132 and second pivot linkage 136. As previously described, in various embodiments, the first pivot linkage 132 and the second pivot linkage 136 may pivot respectively at the joint 162 and the joint 166, with respect to the pivot base 160. Thus, in various embodiments, the extension of first pivot linkage 132 and second pivot linkage 136 may tension the first belt 114 and the second belt 112 respectively. Accordingly, in response to radially outward movement of the first pivot linkage 132 and the second pivot linkage 136 relative to an axis of the motor shaft 150 (e.g., axis A-A'), the first actuator piston 142 and the second actuator piston 146 may provide tension to the first belt 114 and the second belt 112.

In various embodiments, tensioning a first belt 114 and tensioning a second belt 112 may constrain rotation of the brake drum 120. According to various embodiments, because brake drum 120 may be coupled to motor shaft 150 so as to rotate with the motor shaft 150, constraining the rotation of brake drum 120 may also constrain rotation of the motor shaft 150 (e.g., around axis A-A'). Furthermore, in various embodiments, the tensioning of the first belt 114 and the second belt 112 may have a centering effect on the brake drum 120. In various embodiments, the belt park brake system 100 may be configured to have zero back driving when in an engaged state. In that regard, as described above, the gear ratio of actuator 130 may be selected to create significant reflected inertia. Accordingly, a large amount of force would be needed to back drive actuator 130. In an engaged state, actuator 130 thus creates tension in first belt 114 and the second belt 112 and, due to the tension, rotation of brake drum 120 and motor shaft 150 is constrained. Due to the significant reflected inertia, no additional electrical power is consumed to maintain the constraint of brake drum 120 and motor shaft 150.

Figure 6:
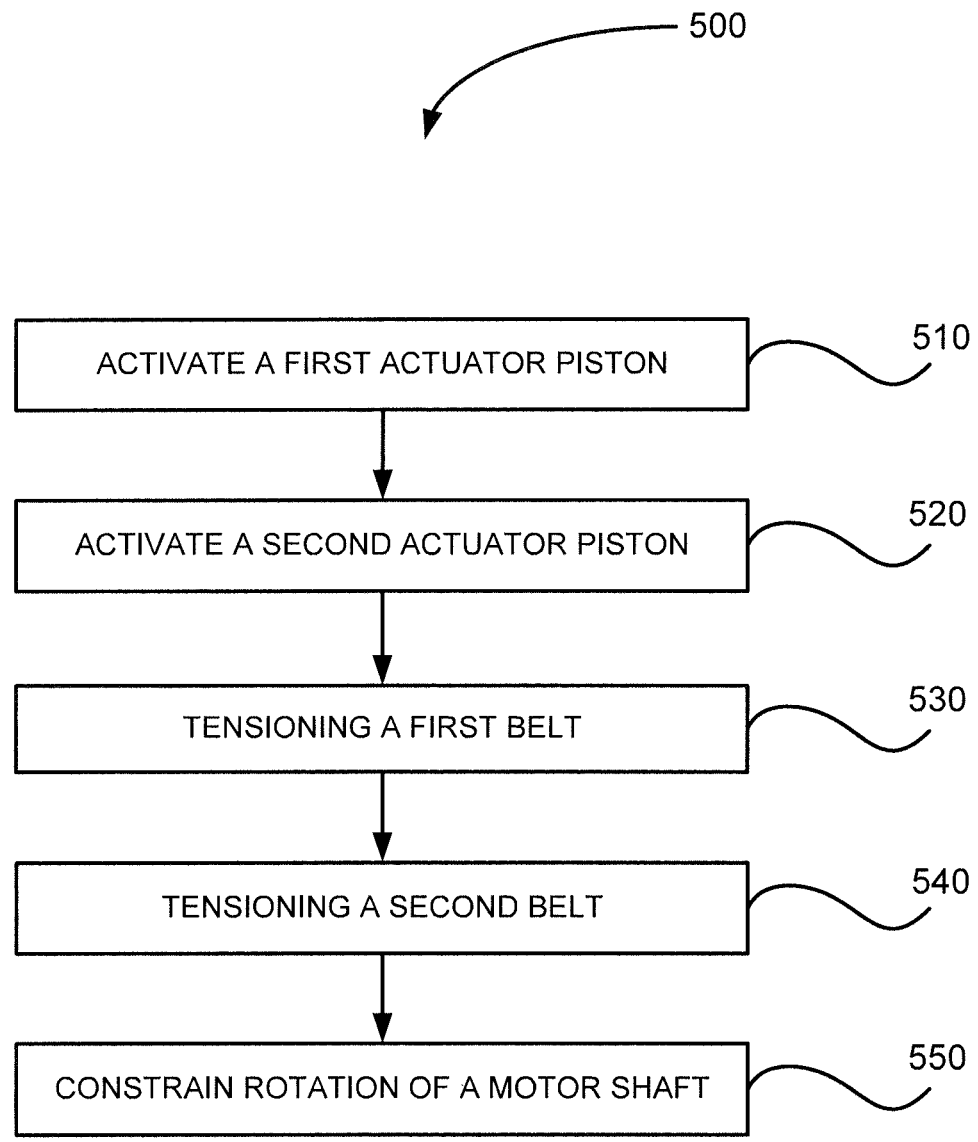
FIG. 6 illustrates a method, in accordance with various embodiments.

With reference to FIG. 6, a method 500 is illustrated. In various embodiments, method 500 may comprise activating a first actuator piston 142 coupled to an actuator 130 and a first pivot linkage 132 (step 510). According to various embodiments, method 500 may comprise activating a second actuator piston 146 coupled to the actuator 130 and a second pivot linkage 136 (step 520). In various embodiments, the first pivot linkage 132 and the second pivot linkage 136 may be coupled to a pivot base 160. According to various embodiments, method 500 may comprise tensioning a first belt 114 at least partially disposed in a first groove 124 of a brake drum 120 and about the first pivot linkage 132 (step 530). Method 500 may also comprise tensioning a second belt 112 at least partially disposed in a second groove 122 of the brake drum 120 and about the second pivot linkage 136 (step 540). For example, in various embodiments, the first belt 114 may be at least partially disposed in the first groove 124 of the brake drum 120 and radially outward of the first pivot linkage 132.

The motor shaft 150 may be coupled to the brake drum 120, according to various embodiments. In various embodiments, at least one of the first belt 114 or the second belt 112 may be a v-belt. According to various embodiments, method 500 may also comprise constraining rotation of the motor shaft 150 (step 550). In various embodiments the motor shaft 150 may be coupled to a brake drum 120 that comprises part of an EMA 10, for example, on an aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A park brake system comprising:
   a motor shaft coupled to a brake drum, wherein the brake drum comprises a first groove and a second groove, wherein the brake drum is mounted to the motor shaft so as to rotate with the motor shaft;
   a first belt at least partially disposed in the first groove and about a first pivot linkage;
   a second belt at least partially disposed in the second groove and about a second pivot linkage;
   a first actuator piston coupled to an actuator and the first pivot linkage;
   a second actuator piston coupled to the actuator and the second pivot linkage; and
   a pivot base coupled to the first pivot linkage and the second pivot linkage.

2. The park brake system of claim 1, wherein the first actuator piston and the second actuator piston are separated by 180 degrees about the brake drum.

3. The park brake system of claim 1, wherein the actuator is a linear actuator.

4. The park brake system of claim 1, wherein the actuator is configured to drive the first actuator piston and the second actuator piston in a radially outward direction relative to an axis of the motor shaft.

5. The park brake system of claim 3, wherein the linear actuator comprises an acme screw.

6. The park brake system of claim 1, wherein the actuator has a gear ratio between 50:1 and 250:1.

7. The park brake system of claim 2, wherein, in response to radially outward movement of the first actuator piston and the second actuator piston, relative to an axis of the motor shaft, the first actuator piston and the second actuator piston provide tension to the first belt and the second belt.

8. An electromechanical actuator ("EMA"), comprising the park brake system of claim 1.

9. The park brake system of claim 1, wherein at least one of the first belt or the second belt is a v-belt.

10. The park brake system of claim 1, wherein the park brake system is configured to have zero back driving when in an engaged state.

11. The park brake system of claim 1, wherein at least one of the first belt or the second belt comprises at least one of an aramid fiber or a para-aramid fiber.

12. The park brake system of claim 7, wherein the first pivot linkage pivots at a joint with respect to the pivot base.

13. A method of operating a park brake system comprising:
    activating a first actuator piston coupled to an actuator and a first pivot linkage;
    activating a second actuator piston coupled to the actuator and a second pivot linkage, wherein the first pivot linkage and the second pivot linkage are coupled to a pivot base;
    tensioning a first belt at least partially disposed in a first groove of a brake drum and about the first pivot linkage;
    tensioning a second belt at least partially disposed in a second groove of the brake drum and about the second pivot linkage, wherein a motor shaft is coupled to the brake drum;
    constraining rotation of the motor shaft.

14. The method of claim 13, wherein at least one of the first belt or the second belt is a v-belt.

15. The method of claim 13, wherein the brake drum comprises part of an electromechanical actuator ("EMA").

* * * * *